United States Patent
Bodmann et al.

(10) Patent No.: US 11,912,257 B2
(45) Date of Patent: Feb. 27, 2024

(54) METHOD FOR CONTROLLING A DRIVING DYNAMICS CONTROL DEVICE, AND DRIVING DYNAMICS CONTROL DEVICE

(71) Applicant: Robert Bosch GmbH, Stuttgart (DE)

(72) Inventors: Jochen Bodmann, Oberstenfeld (DE); Andreas Schmidtlein, Tamm (DE); Christoph Emde, Leingarten (DE)

(73) Assignee: ROBERT BOSCH GMBH, Stuttgart (DE)

( * ) Notice: Subject to any disclaimer, the term of this patent is extended or adjusted under 35 U.S.C. 154(b) by 796 days.

(21) Appl. No.: 17/040,649

(22) PCT Filed: Mar. 7, 2019

(86) PCT No.: PCT/EP2019/055709
§ 371 (c)(1),
(2) Date: Sep. 23, 2020

(87) PCT Pub. No.: WO2019/214865
PCT Pub. Date: Nov. 14, 2019

(65) Prior Publication Data
US 2021/0016751 A1    Jan. 21, 2021

(30) Foreign Application Priority Data

May 9, 2018    (DE) ...................... 10 2018 207 207.8

(51) Int. Cl.
*B60T 8/1755*    (2006.01)
*B60T 13/20*    (2006.01)
(Continued)

(52) U.S. Cl.
CPC .............. *B60T 8/1755* (2013.01); *B60T 7/12* (2013.01); *B60T 13/20* (2013.01); *B60T 13/662* (2013.01);
(Continued)

(58) Field of Classification Search
CPC .......... B60T 8/1755; B60T 7/12; B60T 13/20; B60T 13/662; B60T 17/221;
(Continued)

(56) References Cited

U.S. PATENT DOCUMENTS 6,349,995 B1* 2/2002 Itoh ....................... B60T 13/662
303/116.1
8,950,826 B2* 2/2015 Kunz .................... B60T 8/4872
303/10
(Continued)

FOREIGN PATENT DOCUMENTS

CN    103328822 A    9/2013
CN    104129380 A    11/2014
(Continued)

OTHER PUBLICATIONS

International Search Report for PCT/EP2019/055709, dated May 29, 2019.

*Primary Examiner* — Mussa A Shaawat
(74) *Attorney, Agent, or Firm* — NORTON ROSE FULBRIGHT US LLP; Gerard A. Messina

(57) ABSTRACT

A method is provided for controlling a driving dynamics control unit for influencing the braking of wheels of a motor vehicle. The driving dynamics control device having a pump, which includes at least two pump elements for the supply of brake fluid, and an electric motor, which includes a rotor and a stator for driving the pump elements. The method includes the following steps: detecting the position of the rotor relative to the stator, and adjusting an ideal position of the rotor relative to the stator, the sum of the torques for moving the pump elements lying below a predefined torque limit value, in particular being minimal, in the ideal position.

20 Claims, 3 Drawing Sheets

(51) Int. Cl.
  *B60T 13/66* (2006.01)
  *B60T 17/22* (2006.01)
  *B60T 7/12* (2006.01)
  *H02P 6/16* (2016.01)

(52) U.S. Cl.
  CPC .............. *B60T 17/221* (2013.01); *H02P 6/16* (2013.01); *B60T 2270/10* (2013.01); *B60T 2270/306* (2013.01)

(58) Field of Classification Search
  CPC ........... B60T 2270/10; B60T 2270/306; B60T 8/405; B60T 8/4872; B60T 8/4022; H02P 6/16
  See application file for complete search history.

(56) References Cited

U.S. PATENT DOCUMENTS

| | | | | |
|---|---|---|---|---|
| 10,516,362 | B2* | 12/2019 | Yamato | H02P 29/032 |
| 10,773,595 | B2* | 9/2020 | Drotleff | B60T 13/686 |
| 2002/0158510 | A1* | 10/2002 | Kobayashi | B60T 8/3275 |
| | | | | 303/155 |
| 2004/0183366 | A1* | 9/2004 | Kamiya | B60T 17/221 |
| | | | | 303/11 |
| 2004/0239177 | A1* | 12/2004 | Kusano | B60T 13/686 |
| | | | | 303/119.1 |
| 2005/0067890 | A1* | 3/2005 | Tagome | H02P 6/24 |
| | | | | 303/112 |
| 2005/0200199 | A1* | 9/2005 | Kamiya | B60T 13/662 |
| | | | | 303/191 |
| 2008/0007116 | A1* | 1/2008 | Takahashi | B60T 13/20 |
| | | | | 701/70 |
| 2010/0276239 | A1* | 11/2010 | Wuerth | B60T 8/4072 |
| | | | | 188/358 |
| 2011/0033322 | A1* | 2/2011 | Barthel | H02P 7/0094 |
| | | | | 388/815 |
| 2011/0108375 | A1* | 5/2011 | Wuerth | B60T 8/344 |
| | | | | 188/106 P |
| 2012/0076667 | A1* | 3/2012 | Patient | F04B 11/0041 |
| | | | | 417/44.1 |
| 2013/0026818 | A1* | 1/2013 | Schmidt | B60T 8/36 |
| | | | | 303/116.1 |
| 2013/0292999 | A1* | 11/2013 | Strengert | B60T 8/268 |
| | | | | 303/10 |
| 2014/0244127 | A1* | 8/2014 | Strengert | B60T 7/042 |
| | | | | 701/70 |
| 2015/0061366 | A1* | 3/2015 | Shimada | B60T 7/042 |
| | | | | 303/15 |
| 2015/0232076 | A1* | 8/2015 | Oosawa | B60T 1/10 |
| | | | | 303/10 |
| 2017/0043754 | A1* | 2/2017 | Schuller | B60T 8/4068 |
| 2018/0354484 | A1* | 12/2018 | Yamamoto | B60T 15/028 |
| 2019/0058427 | A1* | 2/2019 | Hafner | H02P 21/10 |

FOREIGN PATENT DOCUMENTS

| | | |
|---|---|---|
| CN | 104972908 A | 10/2015 |
| CN | 105263734 A | 1/2016 |
| DE | 102005030671 A1 | 2/2006 |
| DE | 102007029228 A1 | 1/2008 |
| DE | 102007031750 A1 | 2/2008 |
| EP | 2019474 A2 | 1/2009 |
| WO | 2009127472 A1 | 10/2009 |
| WO | 2012039845 A2 | 3/2012 |
| WO | 2015161958 A2 | 10/2015 |

* cited by examiner

METHOD FOR CONTROLLING A DRIVING DYNAMICS CONTROL DEVICE, AND DRIVING DYNAMICS CONTROL DEVICE

FIELD

The present invention relates to a method for controlling a driving dynamics control device and to a driving dynamics control device.

BACKGROUND INFORMATION

In driving dynamics control devices such as ESP systems (systems for an electronic stability control) in motor vehicles, the active displacement or supply of brake fluid for an active pressure buildup in the brake fluid or for an evacuation of a low-pressure accumulator chamber for the brake fluid is carried out with the aid of an electrically operated return pump.

When configuring a rotational speed/torque characteristic curve for this electric motor having a rotor and a stator, particular attention should be paid to the ABS (anti-lock braking system) high-pressure configuration point in which the electrically driven return pump has to be capable of starting up against very high pressures or maximally possible pressures of the brake fluid. The electric motor for driving the pump or the return pump must start up at this point as well.

The requirement for the high-pressure configuration point results from the maximum system pressure at which an ABS control should be possible, from the eccentricity of the eccentric bearing and also from the surface of a pump element. In this context it should be pointed out that the required starting torque, i.e., the required minimum torque for the run-up of the motor, depends on the position of the pump element or pump elements, and thus on the position of the rotor relative to the stator.

In order to ensure in conventional vehicle dynamics systems that the electric motor driving the pump elements starts up in any setting or position of the rotor relative to the stator, and thus at any setting or in any position of the pump elements, the configuration point or the electric motor must be designed so that the electric motor starts up even at a maximum sum of the torques at the pump elements. Therefore, the electric motor must be configured with a rotational speed/torque characteristic curve required for this purpose. The electric motor is consequently quite large or very powerful, and thus expensive.

SUMMARY

Embodiments of the present invention may advantageously make it possible to provide a method for controlling a driving dynamics control device, or to provide a driving dynamics control device by which or in which a start-up of an electric motor is ensured at all times even when an electric motor is used that is not very powerful.

According to a first aspect of the present invention, a method is provided for controlling a driving dynamics control device, which is developed to influence the braking of wheels of a motor vehicle. In accordance with an example embodiment of the present invention, the driving dynamics control device has a pump, which includes at least two pump elements for the supply of brake fluid, and an electric motor, which includes a rotor and a stator for driving the pump elements, the example method having the following steps: detecting the position of the rotor relative to the stator; and adjusting an ideal position of the rotor relative to the stator, the sum of the torques for moving the pump elements lying below a predefined torque limit value, in particular being minimal, in the ideal position.

One advantage of this example method is that the electric motor generally has to have only low power. Because the rotor, and thus the pump elements, is/are easily movable when the rotor is in the ideal position, or in other words, a low torque is required to move the pump elements, the electric motor is usually easy to start up at all times. The high pressure configuration point, i.e., a point in the rotational speed/torque characteristic curve at which the electrically driven pump has to start up against very high pressures or system pressures of the brake fluid (e.g., in the ABS functionality), may thus be generally low. The electric motor, and consequently the driving dynamics control device, is thus typically able to be developed in a technically uncomplicated and economical as well as a compact manner. Another advantage is that the electric motor starts up very quickly as a rule and brake fluid is consequently able to be supplied very rapidly by the pump.

According to a second aspect of the present invention, a driving dynamics control device for influencing the braking of wheels of a motor vehicle is provided, the driving dynamics control device including the following: a pump having at least two pump elements for the supply of brake fluid, and an electric motor including a rotor and a stator for driving the pump elements, characterized by a position detection device for detecting the position of the rotor relative to the stator, and a control device for adjusting the position of the rotor relative to the stator to an ideal position, the sum of the torques for moving the pump elements lying below a predefined torque limit value, in particular being minimal, in the ideal position.

One advantage of this driving dynamics control device is that the electric motor typically has to have only low power. Since the rotor and thus the pump elements is/are easily movable when the rotor is in the ideal position and a low torque is therefore required to move the pump elements, the electric motor of the driving dynamics control device is usually easy to start up at all times. As a result, the high pressure configuration point of the driving dynamics control device may generally be low, that is to say, a point in the rotational speed/torque characteristics curve at which the electrically driven pump has to start up against very high pressures or system pressures of the brake fluid (e.g., in the ABS functionality). The electric motor, and consequently the driving dynamics control device, are generally able to have a technically simple and economical as well as compact design. An additional advantage is that the electric motor normally starts up very quickly and the pump is therefore able to supply brake fluid in a very rapid manner.

Because the rotor position relative to the stator is detected, the rotor is typically able to be stopped in an ideal position or be moved to an ideal position in a technically uncomplicated manner.

Embodiments and variants regarding specific embodiments of the present invention may be considered to be based on the thoughts and recognitions described herein, among other things.

According to one specific embodiment of the present invention, in the method, the ideal position is determined by generating a predefined counterpressure against the supply of the brake fluid with the aid of the pump, and detecting the current of the electric motor required to supply the brake fluid against the generated counterpressure by the pump elements; the particular position of the rotor relative to the stator in which the required current for the electric motor lies below a predefined current value, in particular is minimal, being determined as the ideal position. In this way, the ideal position is usually able to be determined in a rapid and technically simple manner. For example, this may be done during the final assembly of the driving dynamics control device. It is also possible that this takes place during the final assembly of the motor vehicle. There may be multiple ideal positions, that is to say, the sum of the torques lies below the torque limit value in multiple positions of the rotor relative to the stator. It is also possible that the sum of the torques is equally low in multiple positions of the rotor relative to the stator, or in other words, that there are multiple local minima having essentially the same sum of the torques.

According to one specific embodiment of the present invention, in the method, the rotor is adjusted after each movement of the electric motor such that the rotor is situated in the ideal position. This typically ensures that the electric motor is able to start up at all times and the pump is able to supply brake fluid.

According to one specific embodiment of the present invention, in the method, the rotor is moved to the ideal position when the electric motor fails to move despite a start signal for starting the movement of the electric motor. Typically, this offers the advantage that the rotor will not be moved to the ideal position after every stop of the electric motor, which may cause increased wear, etc., but instead is moved to the ideal position only when this becomes necessary, i.e., when the electric motor does not start up despite the start signal. In addition, the energy consumption then is usually lower as a result.

According to one specific embodiment of the present invention, in the method, the electric motor is moved counter to the normal running direction of the electric motor in order to move the rotor to the ideal position. This makes it possible to move the rotor to the ideal position in a generally technically uncomplicated and rapid manner and with a low energy consumption.

According to one specific embodiment of the present invention, in the method, the sum of the torques for moving the pump elements essentially amounts to zero in the ideal position. This offers the advantage that the electric motor usually starts up especially quickly and the pump supplies brake fluid in a particularly rapid manner.

According to one specific embodiment of the present invention, in the method, the pump elements supply brake fluid in alternation. As a rule, this makes it possible to supply the brake fluid in a technically simple and reliable manner while the torques for moving the pump elements can be kept low at the same time.

According to one specific embodiment of the present invention, in the method, the rotor is adjusted to the ideal position when a counterpressure against the supply of the brake fluid is detected that lies above a predefined pressure value, in particular because the brake pedal has been depressed. This offers the advantage that an unnecessary positioning of the rotor relative to the stator is generally avoided. The rotor is adjusted to the ideal position, i.e., stopped in the ideal position or moved to the ideal position, after the motor has stopped moving only when it has to be assumed that the pump must supply brake fluid or has to start up against a high pressure, which means that the sum of the torques required to move the pump elements is likely going to be high, with the possible result that the electric motor may be difficult or slow to start up.

According to one specific embodiment of the present invention, in the method, in order for the rotor to be adjusted to the ideal position, the counterpressure must lie above the predefined pressure value multiple times, in particular at least three times, within a predefined time period and/or for a time period that is longer than a predefined time period. One advantage of this is that an unnecessary adjustment or movement of the rotor to the ideal position usually takes place even less often. The rotor is adjusted or moved to the ideal position only if the likelihood is high that the pump has to supply brake fluid against a high pressure and the electric motor may thus possibly start up only with difficulty or slowly.

According to one specific embodiment of the present invention, in the method, the rotor is adjusted to the ideal position when the fill level of a reservoir from which the pump supplies the brake fluid exceeds a predefined fill level limit value, in particular 80% of the maximum fill level, preferably 90% of the maximum fill level. For the ABS functionality, a portion of the brake fluid is usually supplied into a reservoir in order to achieve a pressure reduction. For this reason, the rotor is normally moved to the ideal position only if it is assumed that the reservoir will soon approach the maximum fill level or would reach the maximum fill level, or will do so during one of the next times when the ABS functionality is used. Typically, an unnecessary adjustment or movement of the rotor in the ideal position or to the ideal position thus takes place even more rarely.

Adjusting the rotor to the ideal position may particularly mean that the rotor, if it was moved in order to supply brake fluid, is stopped in the ideal position at the end of its movement (e.g., when the movement subsides after the supply operation) and/or that the rotor, if it has concluded its movement in a position that is not the ideal position relative to the stator, is actively moved to the ideal position by the electric motor.

The position of the pump elements is typically directly related to the position of the rotor relative to the stator. This means that the pump elements are always situated in the same position again when the rotor is situated at or in the same position relative to the stator.

That a value is "minimal" may particularly mean that the value has a local minimum or a global minimum.

The torque limit value, for example, may amount to 0.03 Nm or 0.01 Nm. The torque limit value may depend on the used supply unit, in particular the pump surface or the eccenter.

It is pointed out that some of the possible features and advantages of the present invention are described here with regard to different specific embodiments. One skilled in the art will recognize that the features of the present method for controlling a driving dynamics control device or for the driving dynamics control device are able to be suitably combined, adapted or exchanged in order to obtain further embodiments of the present invention.

BRIEF DESCRIPTION OF THE DRAWINGS

Below, specific embodiments of the present invention are described with reference to the figures, but neither the figures nor the description herein are to be construed as restricting the present invention.

The figures are merely schematic and not true to scale. Identical reference numerals in the figures denote identical features or features having an equivalent effect.

DETAILED DESCRIPTION OF EXAMPLE EMBODIMENTS

Figure 1:
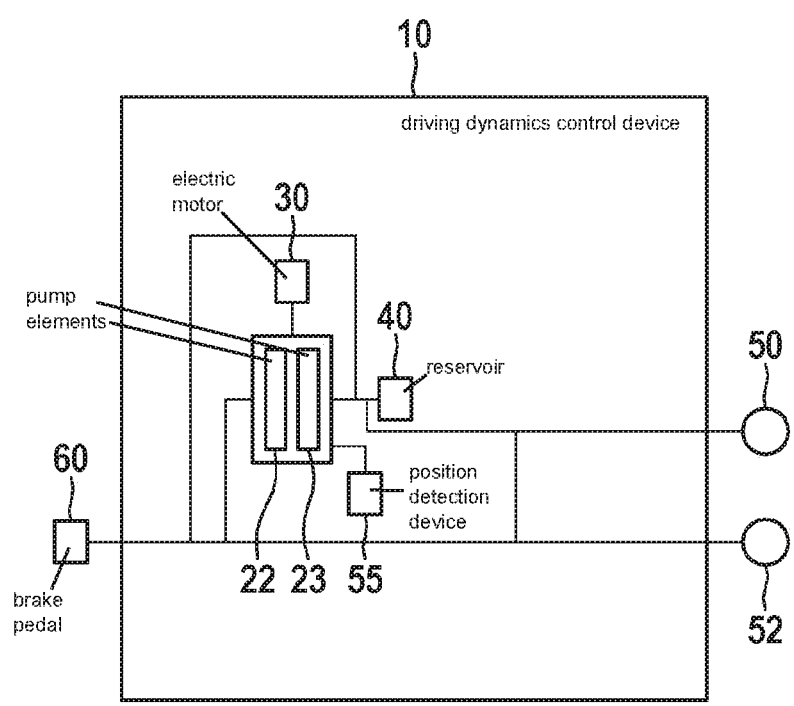
FIG. 1 shows a schematic view of a specific embodiment of the driving dynamics control device according to the present invention.
Figure 2:
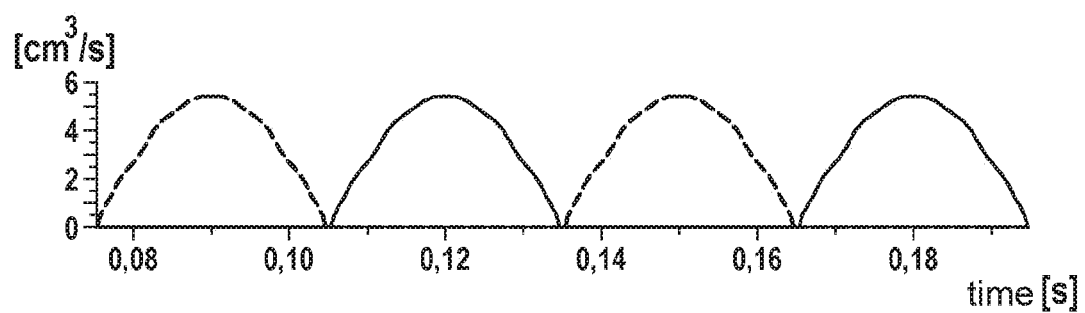
FIG. 2 shows a diagram of the supply flow of the first pump element and the second pump element of the driving dynamics control device of FIG. 1 as a function of time.
Figure 3:
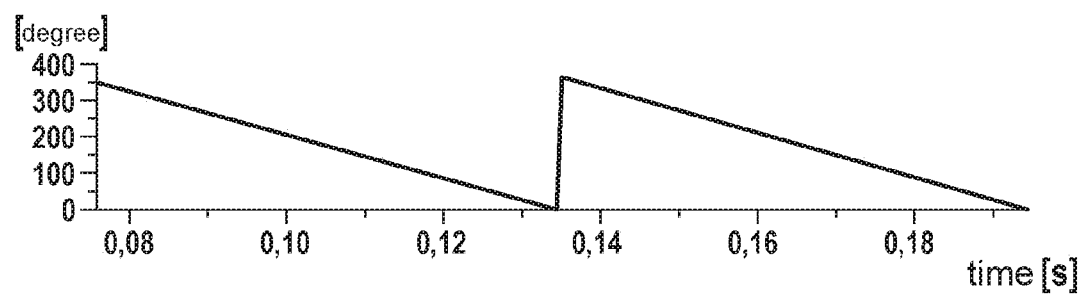
FIG. 3 shows a diagram of an angle of the rotor relative to the stator of the electric motor of the driving dynamics control device of FIG. 1 as a function of time.
Figure 4:
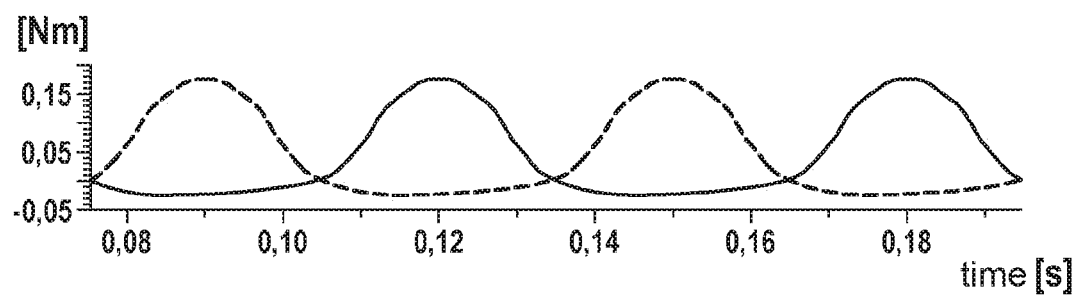
FIG. 4 shows a diagram of the torques of the first pump element and the second pump element of the driving dynamics control device of FIG. 1 as a function of time.
Figure 5:
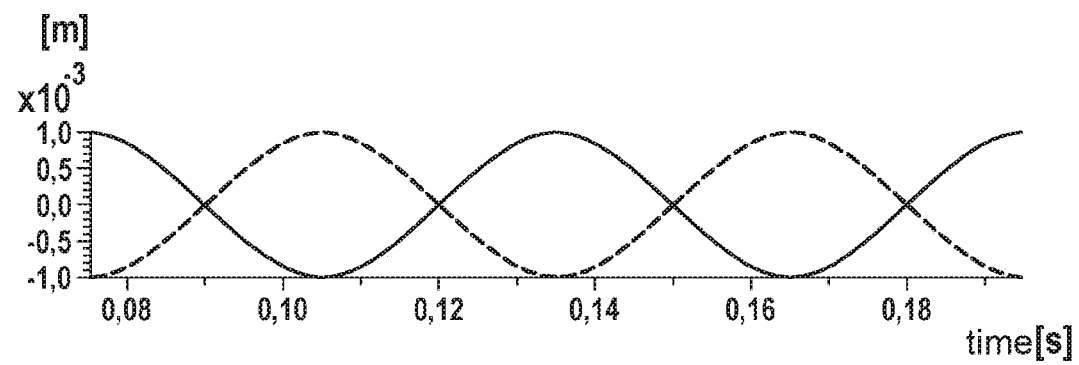
FIG. 5 shows a diagram of the eccentric travels of the first pump element and the second pump element of the driving dynamics control device of FIG. 1 as a function of time.

FIG. 1 shows a schematic view of a specific embodiment of the driving dynamics control device 10 according to the present invention. FIG. 2 shows a diagram of the supply flow of first pump element 22 and second pump element 23 of driving dynamics control device 10 of FIG. 1 as a function of time. FIG. 3 shows a diagram of an angle of the rotor relative to the stator of electric motor 30 of driving dynamics control device 10 of FIG. 1 as a function of time. FIG. 4 shows a diagram of the torques of first pump element 22 and second pump element 23 of driving dynamics control device 10 of FIG. 1 as a function of time. FIG. 5 shows a diagram of the eccentric travel of first pump element 22 and second pump element 23 of driving dynamics control device 10 of FIG. 1 as a function of time.

A multitude of valves has been omitted in FIG. 1 for reasons of clarity.

In FIG. 2, the y-axis indicates the supplied brake fluid quantity in $cm^3$/sec. In FIG. 3, the y-axis indicates the angle of the rotor of electric motor 30 relative to the stator of electric motor 30 in degrees. In FIG. 4, the y-axis denotes the torque in Nm that is required to move respective pump element 22, 23. In FIG. 5, the y-axis denotes the supply position of pump elements 22, 23 in millimeters.

Driving dynamics control device 10 includes an electric motor 30 which drives a pump 20. Pump 20 has at least two pump elements 22, 23. Pump elements 22, 23 may be pistons of a piston pump, for example.

A brake pedal 60 is fluidically connected to driving dynamics control device 10. Brake pedal 60 is used for braking the two, three or four wheels 50, 52 of the motor vehicle.

Driving dynamics control device 10 influences the braking of the two, three or four wheels 50, 52 of the motor vehicle to which driving dynamics control device 10 is connected. Within the framework of the functionality of an anti-lock braking system (ABS), driving dynamics control device 10 is able to briefly release one or multiple wheel(s) 50, 52. Driving dynamics control device 10 is also able to actively block or brake one or multiple wheel(s) 50, 52 within the scope of the electronic stability program (ESP).

Pump 20 supplies a brake fluid. For example, pump 20 is able to supply brake fluid from reservoir 40 in the direction of brake pedal 60.

Pump elements 22, 23 supply the brake fluid in alternation, as may be gathered from FIG. 2. In other words, the one pump element 22 supplies or pumps brake fluid while the other pump element 23 does not supply any brake fluid during this time.

As may be gathered quite well from FIG. 4, the sum of the torques required to move pump elements 22, 23 is not constant over time but is very high at some instants (e.g., at instant t=0.090 s), and very low or minimal at other instants (e.g., at instant t=0.105 s).

The instant or the position of the rotor relative to the stator at which the sum of the torques of pump elements 22, 23 lies below a predefined torque limit value (e.g., 0.01 Nm or approximately 0.005 Nm) or is minimal, is defined as the ideal position. There may be multiple ideal positions. The ideal positions, i.e., positions in which the sum of the torques is low, can be easily gathered from FIG. 4; the ideal positions are the positions in FIG. 4 in which the sum of the torques of the two pump elements 22, 23 is minimal. At these points, a pump element 22 has a negative torque. In the case of a piston pump, for instance, the pistons may assume different distances from an underside of pump 20.

Pump 20 must especially supply the brake fluid in opposition to an existing counterpressure such as when the driver is operating brake pedal 60. For example, by pressing brake pedal 60, the driver is able to generate a pressure of approximately 200 bar or of approximately 280 bar. Pump 20 must be capable of supplying brake fluid against this pressure.

Driving dynamics control device 10 includes a position detection device 55. Position detection device 55 detects the position of the rotor relative to the stator, i.e., the particular angle of the rotor relative to the stator. This is illustrated in FIG. 3. However, it is also possible that only the position of a pump element 22, 23 is detected because the position of the rotor relative to the stator is unequivocally able to be ascertained in this way since electric motor 30 is connected to pump elements 22, 23. For each angle illustrated in FIG. 3, the positions of pump elements 22, 23 shown in FIG. 5 are fixedly defined.

Electric motor 30 is stationary for part of the time, or in other words, pump 20 is not operated during this time and pump elements 22, 23 stand still or are situated in the neutral state. If pump 20 is now meant to begin supplying brake fluid, electric motor 30 has to generate a torque that is acting on pump elements 22, 23 in an effort to bring them out of the standstill or neutral state and induce them to move. The torque required for the run-up or the operation of pump 20 is the sum of the torques of the two pump elements 22, 23 shown in FIG. 4. If electric motor 30 is started up when the rotor or pump elements 22, 23 is/are in a position such as at instant t=0.090 s, a very high torque is required, which may cause electric motor 30 not to start up and pump 20 not to pump.

When the operation of electric motor 30 is concluded, the rotor is able to be moved to the ideal position or moved to one of the ideal positions so that only a very low torque is required to start up electric motor 30 or pump 20 and to supply the brake fluid, as is required at instant 0.105 s in FIG. 4, for example. Thus, if the rotor is at an angle of approximately 180° (see FIG. 3), only a low torque is required to start the supply of the brake fluid with the aid of pump 20. The minima in FIG. 4 are found at the instants at which the lines of the two torques of pump elements 22, 23 intersect.

For example, the rotor may be moved to the ideal position by moving electric motor 30 counter to the normal running direction. The normal running direction is the direction in which pump 20 supplies brake fluid in the direction of brake pedal 60.

It is also possible that the movement of the rotor is stopped at an instant at which the rotor is in its ideal position. This means that the motor is stopped in one of the ideal positions after the rotor has slowed to a standstill after the operation of electric motor 30 or pump 20.

The ideal position may also include multiple ideal positions, which means that there may be multiple positions of the rotor relative to the stator in which the sum of the torques lies below the torque limit value or in which a minimum of the sum of the torques is present, as illustrated in FIG. 4.

It is also possible to move the rotor to the ideal position only when electric motor 30 fails to start up despite a corresponding start signal. For instance, this is possible because brake fluid is able to be temporarily stored in reservoir 40. In the process, the rotor may be moved to the corresponding angle relative to the stator counter to the normal running direction, for example.

In addition, it is possible to move the rotor to the ideal position only if a (counter) pressure above a minimum pressure value was generated with the aid of brake pedal 60, or is present. For instance, the rotor is moved to the ideal position only when the driver exerts pressure on brake pedal 60 to such an extent that a pressure of more than 150 bar or more than 200 bar is generated in the brake fluid or in the vicinity of brake pedal 60. Since a greater torque may be required here to move the rotor out of the neutral position or to move pump elements 22, 23 out of the neutral position or out of a standstill, the rotor is moved to the ideal position or to one of the ideal positions. During the movement of the rotor, pump elements 22, 23 move along in a corresponding manner because a rigid or fixed relationship exists between the position of the rotor relative to the stator and the position of pump elements 22, 23, as may be gathered from FIG. 3 in conjunction with FIG. 6.

As a further condition apart from the exceeding of the minimum pressure value, it may be stipulated, for example, that the existing counterpressure exceed the minimum pressure value for a certain period of time or that the existing counterpressure exceed it multiple times within a certain period of time, e.g., at least two or three times. Only when this additional condition has been satisfied will the rotor be moved to the ideal position or be stopped in the ideal position.

The ideal position(s) of the rotor is/are able to be determined by detecting or measuring the current electric motor 30 requires to operate pump 20 or to start up pump 20. Because a high torque corresponds to a high current consumption of electric motor 30, a high current consumption means that a high torque or a large sum of the torques is required to move pump elements 22, 23. The same applies in reverse to a low torque. As a result, the sum of the torques for pump elements 22, 23—the components of the sum being shown in FIG. 4—exhibits a minimum when the current consumption of electric motor 30 has a minimum. The sum of the torques for pump elements 22, 23—the components of the sum being shown in FIG. 4—exhibits a maximum when the current consumption of electric motor 30 has a maximum. This determination of the ideal positions may be carried out during the final assembly of vehicle dynamics control device 10 and/or the motor vehicle, for example. A calculation of the ideal positions is another option.

The ideal position(s), that is to say, the respective position of the rotor relative to the stator in which only a low torque is required to operate pump 20, is able to be stored in a non-volatile memory in driving dynamics control device 10 or in the motor vehicle or also stored externally from the motor vehicle (such as in a Cloud).

Pump 20 may be what is known as a return pump, in particular.

In particular, a field-oriented control of electric motor 30 is carried out.

The position detection device may be an optical, electronic or mechanical detection device for detecting the angle of the rotor relative to the stator.

The electric motor could be a brushless DC motor or could encompass such a motor.

It should finally be pointed out that terms such as 'having', 'including', etc. do not exclude any other elements or steps, and a term such as 'a' does not exclude a plurality.

What is claimed is:

1. A method for controlling a driving dynamics control device which is configured to influence braking of wheels of a motor vehicle, the driving dynamics control device including a pump which includes at least two pump elements configured to supply brake fluid, and an electric motor which includes a rotor and a stator configured to drive the pump elements, the method comprising the following steps:
   determining an ideal position for the rotor relative to the stator, the ideal position being determined by:
      generating a predefined counterpressure against the supply by the pump of the brake fluid, and
      detecting the current of the electric motor required to drive the pump elements to supply the brake fluid against the generated counterpressure, the position of the rotor relative to the stator in which the detected required current for the electric motor to drive the pump elements to supply the brake fluid against the generated counterpressure lies below a predefined current value being defined as the ideal position;
   detecting a position of the rotor relative to the stator; and
   adjusting the position of the rotor relative to the stator to the ideal position, a sum of torques for moving the pump elements lying below a predefined torque limit value in the ideal position.

2. The method as recited in claim 1, wherein the sum of the torques is minimal in the ideal position.

3. The method as recited in claim 1, wherein the required current for the electric motor is minimal in the ideal position.

4. The method as recited in claim 1, wherein, after each movement of the electric motor, the position of the rotor relative to the stator is adjusted such that the rotor is situated in the ideal position.

5. The method as recited in claim 1, wherein the position of the rotor relative to the stator is adjusted to the ideal position when the electric motor fails to move despite a start signal for starting a movement of the electric motor.

6. The method as recited in claim 1, wherein, to adjust the position of the rotor to the ideal position, the electric motor is moved counter to a normal running direction of the electric motor.

7. The method as recited in claim 1, wherein the sum of the torques for moving the pump elements amounts to zero in the ideal position.

8. The method as recited in claim 1, wherein the pump elements supply the brake fluid in alternation.

9. The method as recited in claim 1, wherein the position of the rotor relative to the stator is adjusted to the ideal position when it is detected that a counter pressure against the supply of the brake fluid that lies above a predefined pressure value is present because a brake pedal has been depressed.

10. The method as recited in claim 9, wherein: (i) the counter pressure must lie above the predefined pressure value at least three times within a predefined time period in order for the position of the rotor to be adjusted to the ideal position, and/or (ii) the counter pressure must lie above the predefined pressure value for a period of time that is longer than a predefined time period in order for the position of the rotor to be adjusted to the ideal position.

11. The method as recited in claim 1, wherein the position of the rotor relative to the stator is adjusted to the ideal position when a fill level of a reservoir from which the pump supplies the brake fluid exceeds a predefined fill level limit value.

12. The method as recited in claim 11, wherein the predefined fill level limit value is 80% of a maximum fill level.

13. The method as recited in claim 11, wherein the predefined fill level limit value is 90% of a maximum fill level.

14. The method as recited in claim 1, wherein the determining of the ideal position for the rotor relative to the stator is performed during final assembly of the driving dynamics control device.

15. The method as recited in claim 1, wherein the determining of the ideal position for the rotor relative to the stator is performed during final assembly of the motor vehicle.

16. A driving dynamics control device for influencing braking of wheels of a motor vehicle, the driving dynamics control device comprising:
a pump having at least two pump elements for a supply of a brake fluid;
an electric motor including a rotor and a stator configured to drive the pump elements;
a position detection device configured to detect a position of the rotor relative to the stator; and
a control device configured to adjust the position of the rotor relative to the stator to an ideal position, a sum of torques for moving the pump elements lying below a predefined torque limit value in the ideal position;
wherein the ideal position for the rotor relative to the stator is determined by:
generating a predefined counterpressure against the supply by the pump of the brake fluid, and
detecting the current of the electric motor required to drive the pump elements to supply the brake fluid against the generated counterpressure, the position of the rotor relative to the stator in which the detected required current for the electric motor to drive the pump elements to supply the brake fluid against the generated counterpressure lies below a predefined current value being defined as the ideal position.

17. The driving dynamics control device as recited in claim 16, wherein the sum of torques in minimal in the ideal position.

18. The driving dynamics control device as recited in claim 16, wherein the control device is configured to, after each movement of the electric motor, adjust the position of the rotor relative to the stator such that the rotor is situated in the ideal position.

19. The driving dynamics control device as recited in claim 16, wherein the control device is configured to adjust the position of the rotor relative to the stator to the ideal position when the electric motor fails to move despite a start signal for starting a movement of the electric motor.

20. The driving dynamics control device as recited in claim 16, wherein, to adjust the position of the rotor to the ideal position, the control device is configured to move the electric motor counter to a normal running direction of the electric motor.

* * * * *